United States Patent [19]

Takeda

[11] 4,299,089
[45] Nov. 10, 1981

[54] SECONDARY AIR CONTROL SYSTEM IN AN INTERNAL COMBUSTION ENGINE

[75] Inventor: Keisou Takeda, Susono, Japan

[73] Assignee: Toyota Jidosha Kogyo Kabushiki Kaisha, Toyota, Japan

[21] Appl. No.: 116,754

[22] Filed: Jan. 30, 1980

Related U.S. Application Data

[63] Continuation-in-part of Ser. No. 8,234, Feb. 1, 1979, abandoned, which is a continuation of Ser. No. 849,354, Nov. 7, 1977, abandoned.

[30] Foreign Application Priority Data

May 13, 1977 [JP] Japan ............................. 52-054203
Jan. 3, 1978 [DE] Fed. Rep. of Germany ....... 2800190

[51] Int. Cl.³ ............................................ F01N 3/15
[52] U.S. Cl. ...................................... 60/290; 60/301; 60/306
[58] Field of Search ............... 60/276, 290, 306, 289, 60/301

[56] References Cited

U.S. PATENT DOCUMENTS

| | | | |
|---|---|---|---|
| 3,696,618 | 10/1972 | Boyd | 60/276 |
| 3,730,157 | 5/1973 | Gerhold | 60/276 |
| 3,859,541 | 1/1975 | Hattori | 60/306 |
| 3,863,444 | 2/1975 | Nakajima | 60/306 |
| 3,962,867 | 6/1976 | Ikeura | 60/290 |
| 3,974,651 | 8/1976 | Nakajima | 60/290 |
| 4,110,979 | 9/1978 | Miyagi | 60/289 |

Primary Examiner—Douglas Hart
Attorney, Agent, or Firm—Stevens, Davis, Miller & Mosher

[57] ABSTRACT

This application discloses a secondary air control system in an internal combustion engine. The system comprises: an exhaust gas purifying device mounted on an exhaust pipe; a secondary air control valve which comprises a diaphragm actuated by vacuum pressure for controlling secondary supply air to said exhaust gas purifying device; a solenoid valve for controlling said vacuum pressure which acts upon said secondary air control valve; a vacuum sensor which detects the vacuum pressure at a small venturi of a carburetor; a thermo-sensor for detecting the intake air temperature; an air flow meter mounted on a secondary air supply pipe; a thermo-sensor for detecting the secondary air temperature mounted on said secondary air supply pipe, and; a computer to which said valuum sensor, said thermo-sensors, and said air flow meter are connected so as to feed input signals thereto, said solenoid valve being connected to the output of said computer so as to control the secondary air quantity in response to said input signals.

3 Claims, 6 Drawing Figures

SECONDARY AIR CONTROL SYSTEM IN AN INTERNAL COMBUSTION ENGINE

This application is a continuation-in-part of my U.S. application Ser. No. 008,234, filed Feb. 1, 1979, which is a continuation of my U.S. application Ser. No. 849,354, filed Nov. 7, 1977, both now abandoned.

BACKGROUND OF THE INVENTION

The present invention relates to a secondary air control system in an internal combustion engine.

The system comprises means for removing harmful emissions in the exhaust gas and means for supplying secondary air to said removing means. In order to decrease CO (carbon monoxide), HC (hydrocarbon) and $NO_x$ (nitrogen oxide) in the exhaust gas, a three-way catalyzer is arranged on the exhaust pipe of the engine. The three-way catalyzer oxidizes CO and HC and simultaneously dioxidizes $NO_x$, thereby purifying the exhaust gas. The three-way catalyzer effectively acts simultaneously upon the three harmful components only when the exhaust gas is stoichiometric. Accordingly, the air/fuel ratio must be precisely controlled in order to attain the stoichiometric exhaust gas. For this purpose, one method has been proposed wherein the secondary air is injected into the exhaust pipe upstream of the three-way catalyzer. The injection quantity is controlled so that the gas in the exhaust pipe has stoichiometric components. In such a method, an oxygen sensor is generally used for detecting the oxygen ratio in the exhaust gas in order to control the secondary air quantity in response to the output signal of the sensor. However, in such a control method, the secondary air quantity cannot be precisely controlled because the sensing ability of the oxygen sensor is lowered after a long use. Another secondary air control method has been proposed wherein an oxygen sensor is not used. In this second known method, the secondary air is supplied in response to the intake air quantity of the engine. The intake air quantity is calculated on the basis of the intake vacuum of the engine and the number of revolutions per minute of the engine. However, in this second method, the calculation reliability is low because the two signals, intake vacuum signal and engine revolution count signal, are required for the calculation, both of which signals frequently vary in response to the driving condition of the engine.

SUMMARY OF THE INVENTION

An object of the present invention is to provide a secondary air control system wherein the secondary air is supplied in accurate response to the intake air quantity of the engine, so as to attain the optimum component ratio of the exhaust gas so that the exhaust gas purifying device operates with the most effective efficiency.

A secondary air control system according to the present invention comprises:

an exhaust gas purifying device mounted on an exhaust pipe;

a secondary air control valve which comprises a diaphragm actuated by vacuum pressure for controlling secondary supply air to said exhaust gas purifying device;

a solenoid valve for controlling said vacuum pressure which acts upon said secondary air control valve;

a vacuum sensor which detects the vacuum pressure at a small venturi of a carburetor;

a thermo-sensor for detecting the intake air temperature;

an air flow meter mounted on a secondary air supply pipe;

a thermo-sensor for detecting the secondary air temperature mounted on said secondary air supply pipe, and;

a computer to which said vacuum sensor, said thermo-sensors, and said air flow meter are connected so as to feed input signals thereto, said solenoid valve being connected to the output of said computer so as to control the secondary air quantity in response to said input signals.

BRIEF DESCRIPTION OF THE DRAWINGS

The present invention will now be described with reference to the accompanying drawings in which.

DETAILED DESCRIPTION OF PREFERRED EMBODIMENTS

Figure 1:
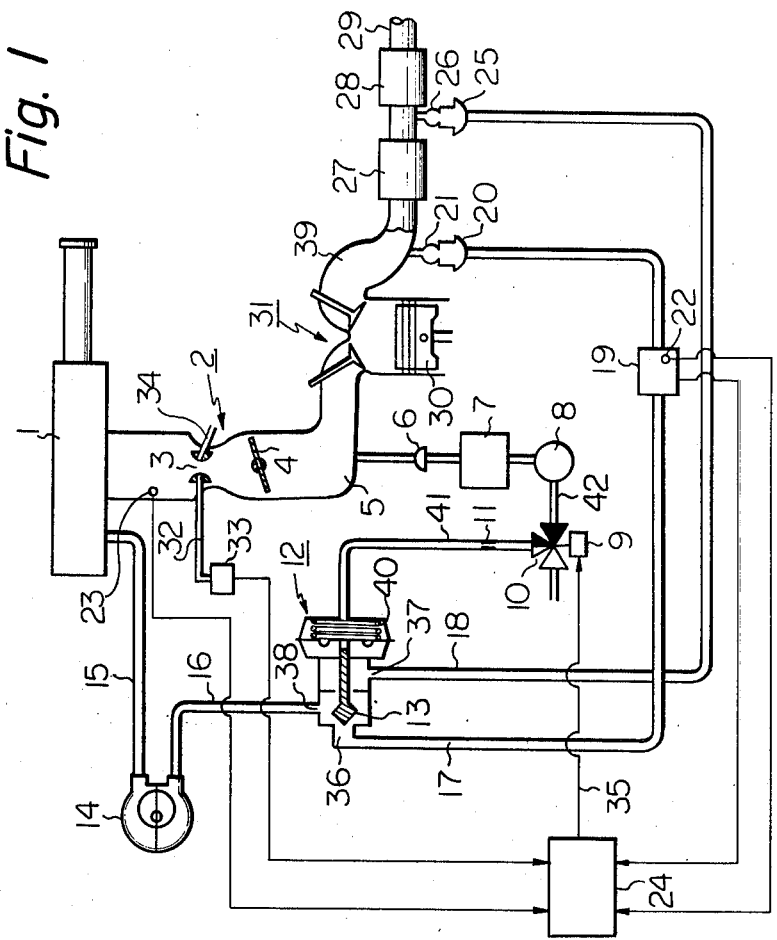
FIG. 1 is a diagrammatic view of an embodiment of the present invention.

A main fuel passage 34 is connected to a small venturi 3 from a float chamber (not shown) of a carburetor 2. Numeral 4 indicates a throttle valve and numeral 30 indicates a piston. A three-way catalyzer 27 is mounted on an exhaust pipe 29 of an engine 31. An oxidation catalyzer 28 is mounted on the exhaust pipe 29 downstream of said three-way catalyzer 27. A suction pipe 15 of an air pump 14 is connected to an air cleaner 1. A discharge pipe 16 of the air pump 14 is connected to an inlet port 38 of a diaphragm type secondary air control valve 12. The secondary air control valve 12 has a first outlet port 36 and a second outlet port 37. The second outlet port 37 operates as a relief port 37. A secondary air supply pipe 17 interconnects the outlet port 36 and the exhaust manifold 39 of the engine 31. A relief pipe 18 interconnects the relief port 37 and the exhaust pipe 29 at the portion between the two catalyzers 27 and 28. A check valve 20 and a secondary air manifold 21 are arranged on the supply pipe 17. A check valve 25 and a secondary air manifold 26 are arranged on the relief pipe 18. The diaphragm chamber 40 of the secondary air control valve 12 communicates with a three-way solenoid valve 10 through a pipe 41. The solenoid valve 10 introduces either atmospheric pressure or vacuum pressure in an intake manifold 5 into the diaphragm chamber 40. A check valve 6, a vacuum reservoir 7 and a regulator 8 are arranged on a pipe 42 which interconnects the solenoid valve 10 and the intake manifold 5. Vacuum pressure at the small venturi 3 is introduced to a vacuum sensor 33 through a vacuum pipe 32. The vacuum sensor 33 is electrically connected to a computer 24. A thermo-sensor 23, which detects the intake air temperature, is also electrically connected to the computer 24. An air flow meter 19 mounted on the secondary air supply pipe 17 and a thermo-sensor 22, which detects the secondary air temperature, are also electrically connected to the computer 24. An output signal line 35 of the computer 24 is connected to an actuator 9 of the solenoid valve 10. An orifice 11 is arranged on the pipe 41.

The operation of the above mentioned secondary air control system is as follows.

The carburetor 2 is adjusted beforehand so that the air/fuel ratio is richer than the stoichiometric ratio, but within the range wherein the engine can be smoothly driven. In order to make up for the shortage of the air in the three-way catalyzer 27, the secondary air is supplied to the exhaust manifold 39 in response to the intake air quantity. The intake air quantity $G_a$ is defined as follows.

$$G_a = K \sqrt{\Delta P}$$
$$K = k \cdot \frac{273.15}{273.15 + T_1}$$
$$\Delta p = A V_1$$

$T_1$: intake air temperature,
$V_1$: vacuum pressure at the small venturi,
k, A: constant coefficients.

The optimum secondary air quantity $G_2$ is defined as follows.

$$G_2 = \left(\frac{1}{\lambda} - 1\right) G_a$$

$\lambda$: the A/F equivalence ratio which is defined as follows.

$$\lambda = \frac{\text{actual } A/F \text{ ratio}}{\text{stoichiometric } A/F \text{ ratio}}$$

The actual secondary air quantity $G_2'$ is defined as follows.

$$G_2' = b \frac{273.15}{273.15 + T_2} \cdot V_2$$

$T_2$: secondary air temperature,
$V_2$: output value of the air flow meter 19,
b: a constant coefficient.

The computer 24 calculates the intake air quantity $G_a$, on the basis of the above definition, reading the signals from the vacuum sensor 33 and the thermo-sensor 23. Then, the computer 24 calculates the optimum secondary air quantity $G_2$ on the basis of the calculated intake air quantity $G_a$. The computer 24 further calculates the actual secondary air quantity $G_2'$, on the basis of the above definition, reading the signals from the air flow meter 19 and the thermo-sensor 22. Then, the computer 24 compares $G_2$ and $G_2'$ in order to achieve a feed back control of the secondary air as follows. The output signal in response to the result of the comparison is transmitted to the actuator 9 of the solenoid valve 10. The solenoid valve 10 is operated in response to the result of the comparison so that the actual quantity $G_2'$ is equalized with the optimum quantity $G_2$. The ratio of the introduced atmospheric pressure to the introduced vacuum pressure (both pressures being introduced into the diaphragm chamber 40 of the control valve 12) is adjusted by the solenoid valve 10. As a result, the opening of the valve 13 is adjusted so as to supply the optimum secondary air quantity through the supply pipe 17. In order to promote especially the dioxidation of $NO_x$ in the three-way catalyzer 27, it is desirable that the secondary air control valve 12 is controlled so that $\lambda$ of the exhaust gas in the three-way catalyzer 27 is slightly below 1, i.e. the secondary air quantity supplied through the pipe 17 is slightly shorter than the quantity which makes the stoichiometric exhaust gas. The excess air, i.e. the air corresponding to the difference between the supplied air through the inlet port 38 by the air pump 14 and the discharged air through the outlet port 36, is introduced to the portion directly upstream of the oxidation catalyzer 28 through the relief pipe 18. The oxidation of CO and HC in the oxidation catalyzer 28 is promoted because of a large amount of air supplied through the relief pipe 18. The three harmful emissions, CO, HC and $NO_x$, are efficiently removed from the exhaust gas during the time it passes through the two catalyzers 27 and 28.

Construction and function of an example of the computer will be described in detail hereinafter.

Figure 3:
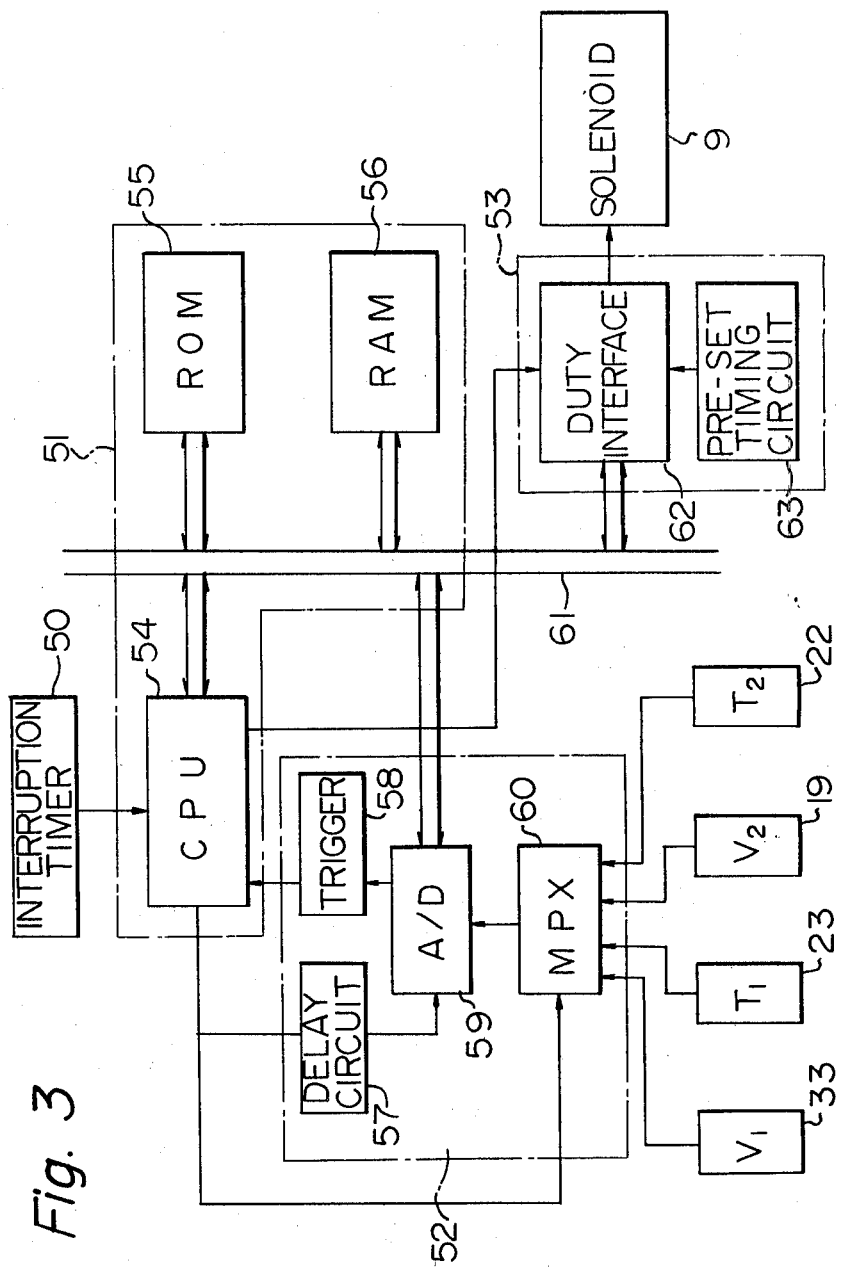
FIG. 3 is a block circuit diagram of the computer of the secondary air control system according to the present invention.

Referring to FIG. 3, the computer comprises an interruption timer 50, a micro-computer circuit 51, an A/D converter circuit 52, and an interface circuit 53. The micro-computer circuit 51 comprises a CPU (central process unit) 54, a ROM (read only memory) 55, and a RAM (random access memory) 56. The A/D converter circuit 52 comprises a delay circuit 57, a trigger 58, an A/D converter 59, and a MPX (multiplexer) 60. The interface circuit 53 comprises a duty interface 62 of the solenoid valve 10, and a pre-set timing circuit 63. The vacuum sensor 33, the thermo-sensor 23 for the intake air, the air flow meter 19, and the thermo-sensor 22 for the secondary air are connected to the MPX 60. The A/D converter 59, the RAM 56, the ROM 55 are connected to the CPU 54 through a BUS 61. An output of the duty interface 62 is connected to the solenoid 9 of the solenoid valve 10.

Figure 4:
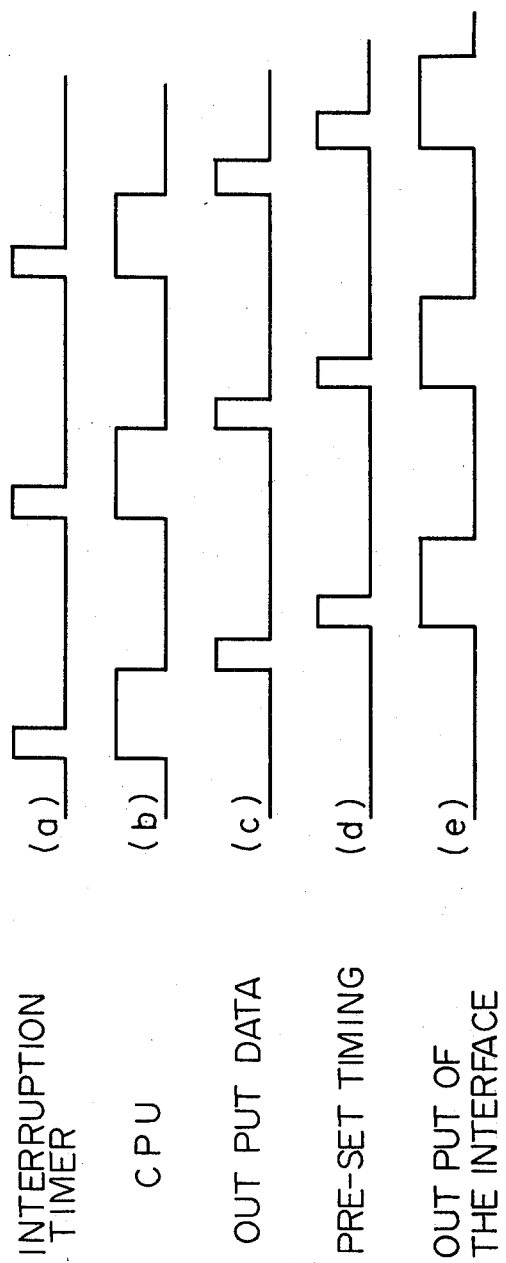
FIG. 4 is a time chart of the micro-computer circuit of the computer of FIG. 3.

The above mentioned computer operates as follows. The interruption timer 50 generates periodic pulse signals, as shown in (a) of FIG. 4, so as to actuate the CPU 54 at predetermined regular intervals. In the micro-computer circuit 51, in response to each pulse signal of the interruption timer 50, the CPU 54 reads out necessary data from the ROM 55 and the RAM 56 and calculates the open time of the solenoid valve 10, i.e. the time during which the vacuum pressure acts upon the secondary air control valve 12 ((b) of FIG. 4). The calculation sequence will be described in detail later. The interface 62 feeds an output signal (e) (FIG. 4) to the solenoid 9, which output signal (e) corresponds to the output signal (c) of the CPU 54, at predetermined regular intervals of a periodic pulse signal (d) generated by the pre-set timing circit 63. Thus, the solenoid valve 10 is opened in response to the result of the calculation by the CPU 54. Data $V_1$, $T_1$, $V_2$, $T_2$ from the sensors 33, 23, 22 and the air flow meter 19 are fed into the RAM 56 through the MPX 60 and the A/D converter 59 and are memorized therein. In the ROM 55, a calculation mode of the intake air quantity $G_a$ using the data $V_1$ and $T_1$, a map (or diagram) for determining the open time of the solenoid valve 10 on the basis of $G_a$, a calculation mode or a map for determining necessary secondary air quantity $G_2$, a calculation mode for determining actual secondary air quantity using the data $V_2$, $T_2$, a calculation mode for determining the compensation coefficient $\alpha$ by comparing $G_2$ with $G_2'$, and a sequence of the calculations are memorized.

Figure 2:
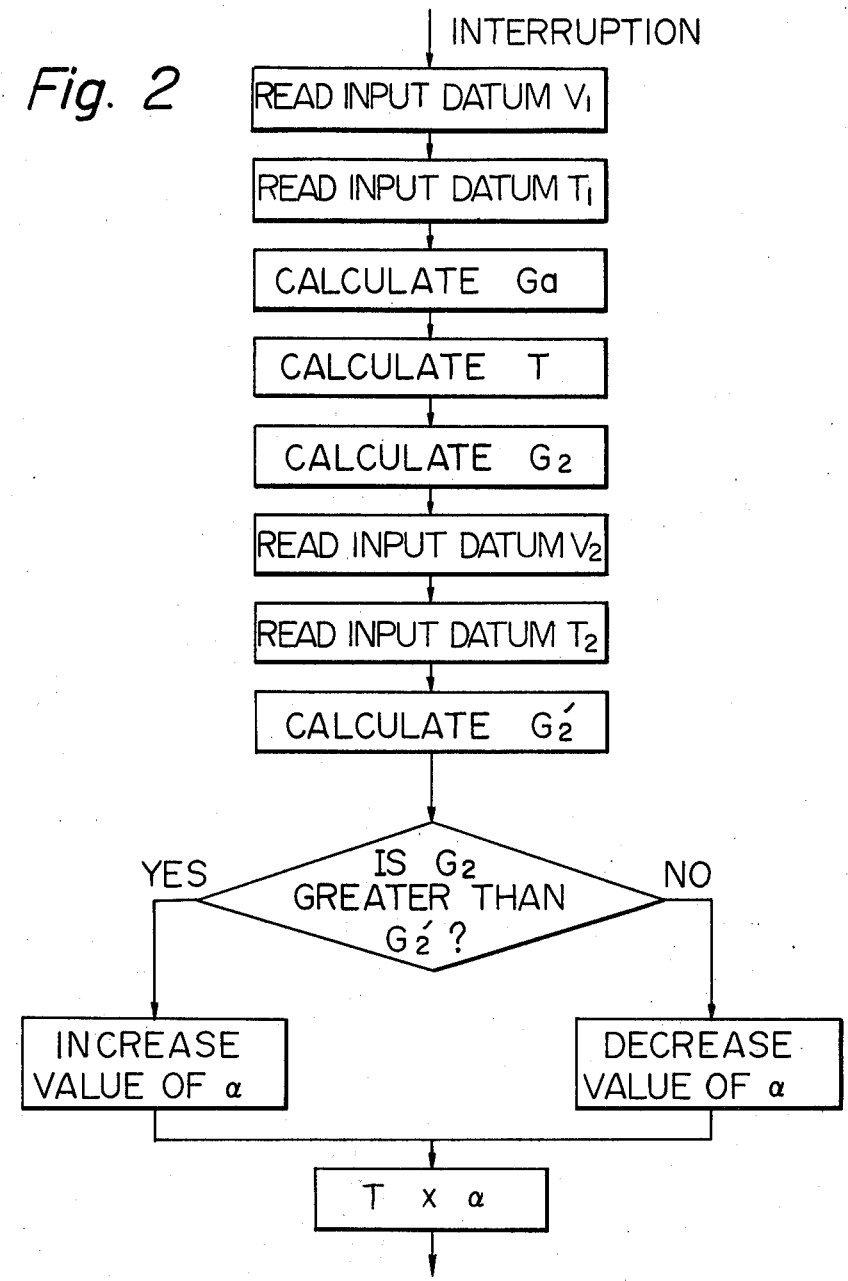
FIG. 2 is a flow chart of the computer of the secondary air control system according to the present invention.

The calculation sequence of the CPU 54 will be described hereinafter with reference to FIG. 2. When the interruption pulse is input, the CPU 54 reads out data $V_1$, $T_1$ from the RAM 56 and calculates the intake air quantity $G_a$ and the open time T of the solenoid valve. Then, the CPU 54 calculates the necessary secondary air quantity $G_2$ on the basis of the calculation result of $G_a$.

Figure 6:
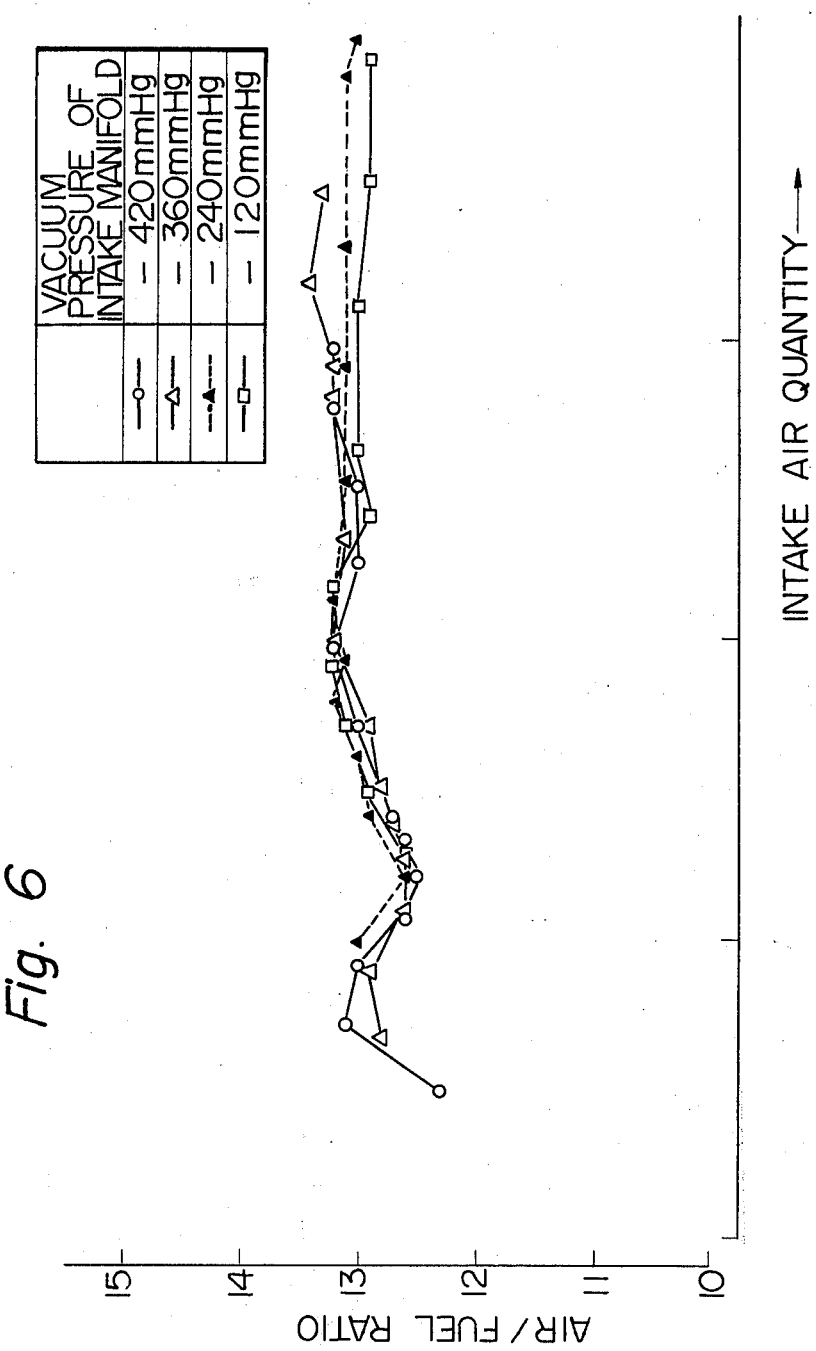
FIG. 6 is a graphic view of a results of a carburetor test representing air/fuel ratio relative to the intake air quantity.

In the above calculation mode, the necessary secondary air quantity $G_2$ is calculated on the basis of the characteristic value $\lambda$ of the carburetor instead of actual measured data of the air/fuel ratio. In carburetor manufacturing, carburetors can be produced so that values of $\lambda$ of the products are precisely constant and the value of $\lambda$ reliably corresponds to the actual air/fuel ratio of the carburetor. Therefore, the necessary secondary air quantity $G_2$ can be reliably calculated on the basis of $\lambda$ without using the actual air/fuel ratio. Also, in the calculations of $G_2$ and T using the map, reliable results can be attained by using the map which was made on the basis of a sufficient amount of experimental data of the carburetor. An experimental result of tests of a carburetor representing an air/fuel ratio relative to the intake air quantity is shown in FIG. 6. As can be seen from the graph of FIG. 6, the air/fuel ratio of the carburetor is almost constant i.e., changes within a tolerance range for the calculation, even if the vacuum pressure of the intake manifold or the intake air quantity changes.

Then, the CPU 54 calculates actual secondary air quantity $G_2'$ on the basis of data $V_2$, $T_2$ in the RAM 56. Then, $G_2$ and $G_2'$ are compared with each other. If $G_2'$ is greater than $G_2$, a compensation coefficient $\alpha$ is decreased by an amount corresponding to a predetermined constant coefficient. The CPU 54 feeds the compensated output signal $I \times \alpha$ to the solenoid valve. Therefore, the open time of the valve is shortened. On the other hand, if the $G_2'$ is smaller than $G_2$, $\alpha$ is increased so that the open time of the valve is elongated.

Figure 5:
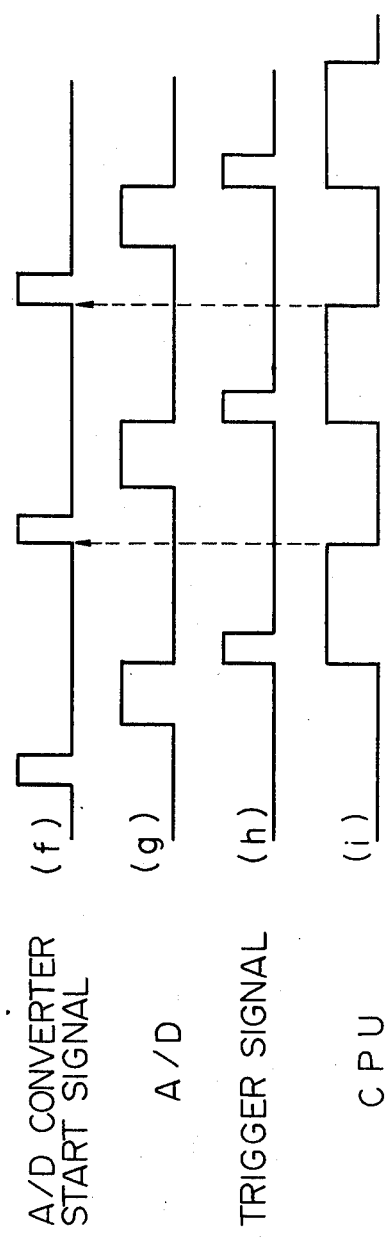
FIG. 5 is a time chart of the A/D converter circuit of the computer of FIG. 3.

A/D converter circuit 52 (FIG. 3) operates as follows. Referring to FIG. 5, in response to an A/D converter start signal (f) from the CPU 54, through the delay circuit 57, the A/D converter 59 converts the analogue data $V_1$, $T_1$, $V_2$, $T_2$ into digital data in a predetermined sequence by the MPX 60 ((g) of FIG. 5). The digital data $V_1$, $T_1$, $V_2$, $T_2$ are supplied into the RAM 56 and memorized therein. After one converting cycle is completed, the trigger circuit 58 feeds a pulse signal (h) to the CPU 54 so as to achieve calculations on the basis of the latest data, as shown in (i) of FIG. 5.

As mentioned above, the computer 24 can determine the optimal secondary air quantity in response to the intake air quantity, and achieve feed back control of the secondary air.

The valve 13 of the secondary air control valve 12 can be actuated by a pulse motor instead of the diaphragm. In such a case, the pulse motor is driven by the pulse signal in response to the difference between the calculated optimum quantity $G_2$ and the actual quantity $G_2'$.

In the above mentioned secondary air control system, the secondary air quantity supplied to the three-way catalyzer is precisely controlled in response to the intake air quantity because the intake air quantity is accurately calculated by the computer on the basis of the small venturi vacuum pressure. In addition, all of the excess air is supplied to the oxidation catalyzer through the relief pipe. Accordingly, the harmful emissions in the exhaust gas are effectively removed by the three-way catalyzer and the oxidation catalyzer.

It should be understood that the invention is not limited to the above mentioned embodiment, but can be varied within the scope of appended claims.

What is claimed is:

1. A secondary air control system in an internal combustion engine comprising:
   an exhaust gas purifying device mounted on an exhaust pipe;
   a secondary air control valve which comprises a diaphragm actuated by vacuum pressure for controlling secondary supply air to said exhaust gas purifying device;
   a solenoid valve for controlling said vacuum pressure which acts upon said secondary air control valve;
   a vacuum sensor which detects the vacuum pressure at a small venturi of a carburetor;
   a thermo-sensor for detecting the intake air temperature;
   an air flow meter mounted on a secondary air supply pipe;
   a thermo-sensor for detecting the secondary air temperature mounted on said secondary air supply pipe, and;
   a computer to which said vacuum sensor, said thermo-sensors, and said air flow meter are connected so as to feed input signals thereto, said solenoid valve being connected to the output of said computer so as to control the secondary air quantity in response to said input signals.

2. A secondary air control system according to claim 1, wherein said exhaust gas purifying device comprises a three-way catalyzer mounted on the exhaust pipe of the engine and an oxidation catalyzer arranged downstream of said three-way catalyzer, said secondary air control valve having two outlet ports, one being connected to the upstream portion of said three-way catalyzer and the other being connected to the portion between said two catalyzers by pipe means.

3. A secondary air control system according to claim 1, wherein said computer calculates an optimum secondary air quantity on the basis of the signal from said vacuum sensor and compares the calculated quantity with the actual air flow quantity detected by said air flow meter so as to achieve the feed back control of the secondary air in response to the result of the comparison.

* * * * *